United States Patent
Kawahara et al.

(10) Patent No.: US 11,321,424 B2
(45) Date of Patent: *May 3, 2022

(54) PREDICTING VARIABLES WHERE A PORTION ARE INPUT BY A USER AND A PORTION ARE PREDICTED BY A SYSTEM

(71) Applicant: INTERNATIONAL BUSINESS MACHINES CORPORATION, Armonk, NY (US)

(72) Inventors: Ryo Kawahara, Tokyo (JP); Takayuki Osogami, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 769 days.

This patent is subject to a terminal disclaimer.

(21) Appl. No.: 15/662,666

(22) Filed: Jul. 28, 2017

(65) Prior Publication Data
US 2019/0034385 A1    Jan. 31, 2019

(51) Int. Cl.
G06N 5/00    (2006.01)
G06N 5/04    (2006.01)
G06F 17/18    (2006.01)
G06N 20/00    (2019.01)
G06Q 40/08    (2012.01)

(52) U.S. Cl.
CPC ............ *G06F 17/18* (2013.01); *G06N 5/003* (2013.01); *G06N 5/046* (2013.01); *G06N 20/00* (2019.01); *G06Q 40/08* (2013.01)

(58) Field of Classification Search
CPC ........... G06N 5/003; G06N 5/046; G06N 5/02
See application file for complete search history.

(56) References Cited

U.S. PATENT DOCUMENTS

| | | | |
|---|---|---|---|
| 6,505,185 B1 | 1/2003 | Chickering | |
| 6,718,315 B1* | 4/2004 | Meek | G06N 20/00 706/12 |
| 6,810,368 B1 | 10/2004 | Pednault | |
| 7,596,545 B1* | 9/2009 | Lee | G06Q 30/02 |
| 8,843,423 B2 | 9/2014 | Chu et al. | |
| 2004/0172347 A1* | 9/2004 | Barthel | G06N 5/04 705/31 |
| 2004/0254903 A1* | 12/2004 | Heckerman | G06N 7/005 706/46 |
| 2005/0257148 A1* | 11/2005 | Goodman | G06F 40/174 715/226 |

(Continued)

OTHER PUBLICATIONS

Tsang, Smith, et al. "Decision trees for uncertain data." IEEE transactions on knowledge and data engineering 23.1 (2009): 64-78. (Year: 2009).*

(Continued)

*Primary Examiner* — Hal Schnee
(74) *Attorney, Agent, or Firm* — Tutunjian & Bitetto, PC; Kurt Goudy

(57) ABSTRACT

A method is presented for predicting values of multiple input items. The method includes allowing a user to select a first set of variables and input first values therein and predicting second values for a second set of variables, the second values predicted in real-time as the first values are being inputted by the user. A tree-based prediction model is used to predict the second values. The tree-based prediction model is a regression tree or a decision tree.

13 Claims, 11 Drawing Sheets

(56) References Cited

U.S. PATENT DOCUMENTS

| | | | | |
|---|---|---|---|---|
| 2007/0041638 | A1* | 2/2007 | Liu | G06K 9/6282 382/170 |
| 2007/0136264 | A1* | 6/2007 | Tran | G06F 16/9535 |
| 2012/0207359 | A1* | 8/2012 | Konukoglu | G06K 9/6277 382/128 |
| 2014/0122173 | A1 | 5/2014 | Wang et al. | |
| 2015/0161549 | A1 | 6/2015 | Modarresi | |
| 2016/0048566 | A1* | 2/2016 | Meng | G06F 16/2465 706/12 |
| 2016/0063209 | A1* | 3/2016 | Malaviya | G16H 50/30 706/12 |
| 2017/0060831 | A1* | 3/2017 | Smythe | G06N 5/048 |
| 2017/0061284 | A1 | 3/2017 | Amano et al. | |
| 2017/0083920 | A1 | 3/2017 | Zoldi et al. | |
| 2017/0228660 | A1* | 8/2017 | Kutzkov | G06N 20/00 |
| 2018/0114139 | A1 | 4/2018 | Kucera | |
| 2018/0121622 | A1* | 5/2018 | Armstrong | G06N 5/045 |
| 2019/0026634 | A1* | 1/2019 | Homeyer | G06Q 10/103 |

OTHER PUBLICATIONS

Lavner, Yizhar, and Dima Ruinskiy. "A decision-tree-based algorithm for speech/music classification and segmentation." EURASIP Journal on Audio, Speech, and Music Processing 2009 (2009): 1-14. (Year: 2009).*

Vateekul, Peerapon, and Kanoksri Sarinnapakorn. "Tree-based approach to missing data imputation." 2009 IEEE International Conference on Data Mining Workshops. IEEE, 2009. (Year: 2009).*

Rahman, Geaur, and Zahidul Islam. "A decision tree-based missing value imputation technique for data pre-processing." Proceedings of the Ninth Australasian Data Mining Conference—vol. 121. 2011. (Year: 2011).*

Burgette et al., "Multiple Imputation for Missing Data via Sequential Regression Trees," American Journal of Epidemiology. vol. 172. No. 9. Sep. 14, 2010. pp. 1070-1076.

Gimpy et al., "Estimation of Missing Values Using Decision Tree Approach," International Journal of Computer Science and Information Technologies. vol. 5. No. 4. 2014. pp. 5216-5220.

He et al., "Missing Data Imputation for Tree-Based Models," Doctoral Dissertation, University of California, Los Angeles. 2006. pp. 1-96.

Ahmed Hamed, "How to Use a Decision Tree to Fill in the Missing Values of a Data Set?," www.researchgate.net/post/How_to_use_a_decision-tree-to-fill-in-the-missing-values-of-a-data-set. Retrieved from Internet May 23, 2017. pp. 1-3.

Valdiviezo et al., "Tree-based prediction on incomplete data using imputation or surrogate decisions," Journal Information Sciences. vol. 311. Issue C. Aug. 1, 2015. pp. 1-31.

Wikipedia, "Imputation (statistics)," https://en/wikipedia.org/w/index.php?title=Imputation_(statistics)&oldid=725179914. Retrieved from Internet on Apr. 25, 2017.

Kocev et al., "Using single-and multi-target regression trees and ensembles to model a compound index of vegetation condition", Ecological Modelling. vol. 220, No. Apr. 8, 24, 2009. pp. 1159-1168.

Lavner et al., "A Decision-Tree Based Algorithm for Speech/Music Classification and Segmentation", EURASIP Journal on Audio, Speech, and Music Processing. vol. 2009. Dec. 2009. pp. 1-14.

Tsang et al. "Decision Trees for Uncertain Data", IEEE Transactions on Knowledge and Data Engineering. vol. 23. No 1. Jan. 2011. pp. 64-78.

Office Action with cited art in corresponding U.S. Appl. No. 15/830,475 dated Sep. 23, 2020. pp. 1-21.

Office Action with cited art in corresponding U.S. Appl. No. 15/830,475 dated Dec. 17, 2020. pp. 1-13.

Office Action with cited art in corresponding U.S. Appl. No. 15/830,475 dated Mar. 22, 2021(pp. 1-9).

Rokach et al., "Decision trees", Data mining and knowledge discovery handbook. Springer, Boston, MA, 2005. pp. 165-192. (Year: 2005).

Allowance and Fee(s) Due issued in corresponding U.S. Appl. No. 15/830,475 dated Jan. 24, 2022 (9 pgs).

* cited by examiner

PREDICTING VARIABLES WHERE A PORTION ARE INPUT BY A USER AND A PORTION ARE PREDICTED BY A SYSTEM

BACKGROUND

Technical Field

The present invention relates to an apparatus for predicting variables where a portion of the variables are input by a user and a portion of the variables are predicted by the system.

Description of the Related Art

Financial advice services are provided to customers by financial advisers. In these services, financial simulations for household accounts, household assets, insurance, etc., have been provided. Since the simulation needs a large number of parameters, customers need to provide answers to a large number of questions (e.g., age, sexuality, marital status, number of children, etc.) in an answer sheet. Sometimes, it is difficult for the customers to answer some questions due to a psychological hurdle and/or a lack of knowledge. Advisers (e.g., financial planners) can help customers fill in the answer sheet. However, in the absence of the advisers, some customers may give up answering difficult questions or may provide inaccurate answers in the answer sheet.

SUMMARY

In accordance with an embodiment, a system is provided for predicting values of multiple input items. The system includes a processor and a storage device coupled to the processor, wherein the storage device has stored thereon a program, and wherein the processor is configured to execute the program to perform operations, wherein the operations include: allowing a user to select a first set of variables and input first values therein and predicting second values for a second set of variables, the second values predicted in real-time as the first values are being inputted by the user.

In accordance with an embodiment, a method is provided for predicting values of multiple input items. The method includes allowing a user to select a first set of variables and input first values therein and predicting second values for a second set of variables, the second values predicted in real-time as the first values are being inputted by the user.

In accordance with an embodiment, computer program product for predicting values of multiple variables is provided. The computer program product includes a computer readable storage medium having computer readable program code embodied therein, the computer readable program code including: computer readable program code, when executed by a processor of a computer, configured to perform: allowing a user to select a first set of variables and input first values therein, and predicting second values for a second set of variables, the second values predicted in real-time as the first values are being inputted by the user.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The following description will provide details of preferred embodiments with reference to the following figures wherein.

Throughout the drawings, same or similar reference numerals represent the same or similar elements.

DETAILED DESCRIPTION

Figure 1:
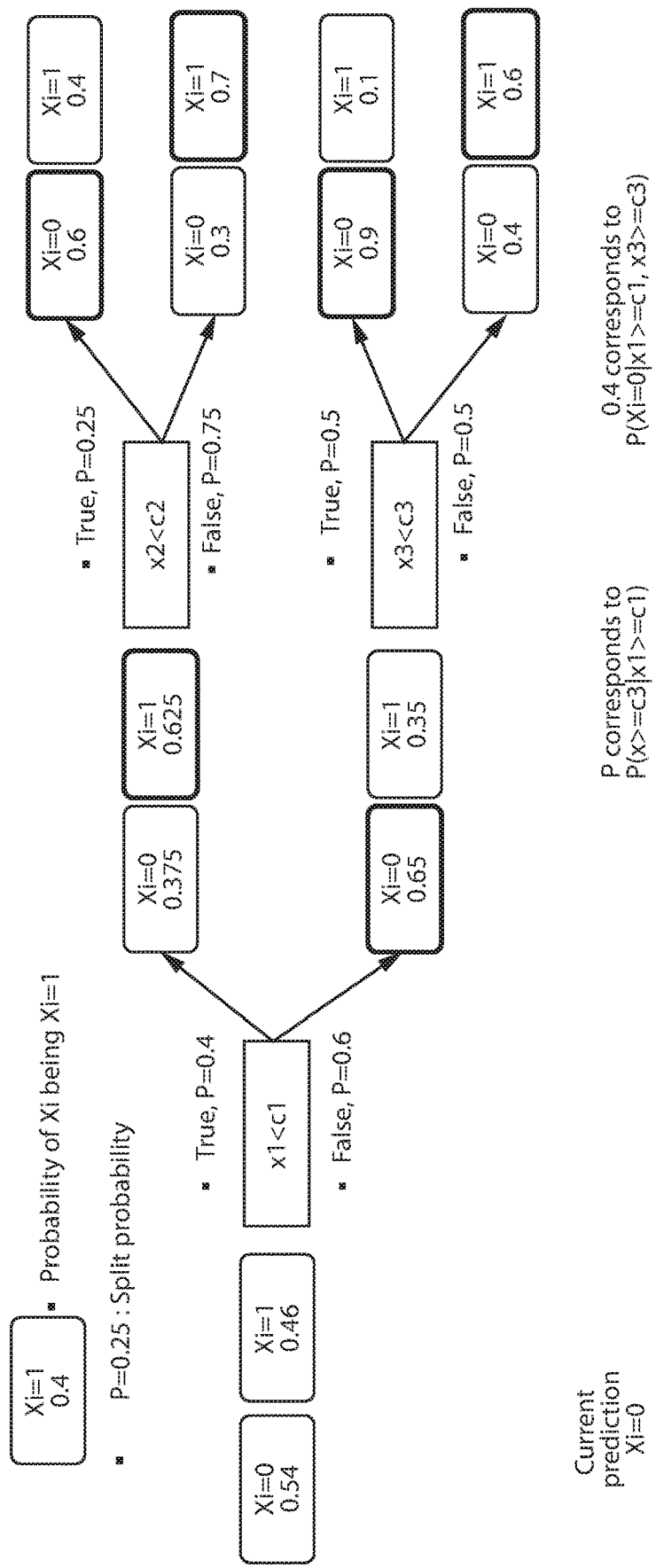
FIG. 1 illustrates operational flow of an exemplary configuration of an initial state where no input is provided by a user, in accordance with an embodiment of the present invention.

Embodiments in accordance with the present invention provide methods and devices for predicting values of multiple input parameters and/or items. In consumer financial services such as a life insurance or a financial planning, a consumer needs to input various parameters such as income, asset status, family structure, etc. in order to perform sales, consulting, or simulation. It is often that the number of such parameters exceed one hundred, which in turn becomes a time consuming task for a consumer. Embodiments in accordance with the present invention provide methods and devices for allowing a user to choose or select any parameters and input values and the system dynamically predicts the values of the rest or remaining parameters based on the inputs received by the user. The prediction is performed in real-time while the user is inputting values for other parameters and/or variables.

In a naïve way, a set of prediction models can be prepared which use variables already input as predictor variables and variables not yet input as response variables, in advance. However, if there are N parameters, $2^N$ prediction models need to be prepared since there are $2^N$ patterns of choices to input. This is an unaffordable size to be prepared in advance when N becomes large.

Thus, embodiments in accordance with the present invention provide methods and devices for using N regression models instead of $2^N$ regression models. A response variable of each of the regression models corresponds to one input item, and predictor variables of the models correspond to the rest of the input items. The model allows for the missing of values of the predictor variables. Then, regression trees and/or decision trees are used or created for the regression models. The tree splits are evaluated for variables whose values are input, while in the case of missing values, splits are considered with weights, which is proportional to the empirical split ratio so that the marginal probabilities are approximated.

In particular, definitions are set such as: Let $\{Xi\}$ be variables to be input, $xi$ to be a value of $Xi$, $D=\{xim|i=1,\ldots,N, m=1,\ldots,M\}$ be known dataset and let $Cv$, $Cv'$, $\ldots$, $Cv^0 \in$ Boolean be the satisfactions of the split conditions in the path from node v to the root node $v^0$. These definitions are used for the decision tree/regression tree modeling.

Regarding modeling, for each variable $Xi$, a tree-based prediction model of $Xi$ whose predictor variables are the rest of the variable $\{Xj|j \ne i\}$ is constructed using existing data D. Every leaf node v has the probability $P(Xi|v)$ of $Xi$ being $xi$. Other nodes have a split probability defined by: $P(Cv'|v')$. The tree models are searched with, e.g., a depth-first search. From a leaf node to the root node, a realization probability $P(Xi|v')$ of node $v'$ is computed as a marginal probability of the realization probability $P(Xi|v)$ of the nodes $\{v\}$, which are child nodes of $v'$.

$P(Xi|v') = \Sigma_{b \in \{true, false\}} P(Cv'=b|v') P(Xi|vb)$, vb=one of $\{vtrue, vfalse\}$, which are the child nodes of $v'$.

Regarding prediction (executed when a new input is provided by a user), the nodes whose splits are determined by the input are identified. In the identified nodes, the subtrees that have no probability to be satisfied are removed. Then, $P(xi|v')$ of the parent node is updated recursively using the formula $$P(Xi|v') = \Sigma_{b \in \{true, false\}} P(Cv'=b|v') P(Xi|vb).$$

In the root node $xi^* = \mathrm{argmax}_{xi} P(xi| \mathrm{root})$ is computed and output as the prediction.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Definition of Symbols:

$y_i$: Predicted value of input i-th item (the value of response variable).

$x_i$: Input value of input i-th item (the value of predictor variable).

fi: Prediction model for i-th item.

$X_i$: Variable or variable label of i-th input item. Capital letter indicates that it is a variable and small letter indicates that it is a value of the corresponding variable.

$D=\{xim|i=1,\ldots,N, m=1,\ldots,M\}$: Dataset of the inputs.

N: the number of input items, or variables. That is, i=1, \ldots, N.

M: data size.

v: a node within a tree model. Here, the subscript i is omitted although a tree model belongs to i-th input item.

v', v0: the parent node of v and the root node of v, respectively.

C(v), Cv: a split condition of node v. e.g., $X2<c2$. It can be true or false depending on the actual values of a variable X2. In general, a split condition in a model for i-th item depends on one variable, which need not to be Xi.

$P(Xi=x|v)$: Conditional probability of $Xi$ being value x at a node v. We sometimes omit the value x to discuss the general case. Note that node v is a short hand for denoting all the conditions in the ancestors of v, e.g., $P(Xi=x|v)=P(Xi=x|Cv'=bv', Cv''=bv'' \ldots, Cv0=bv0)$, where bv', bv'', \ldots bv0 are Boolean values.

$P(Cv=b|v)$: Conditional probability of condition Cv of a node v being b. Again b is a Boolean value and can be omitted to discuss the general cases. Note that node v is a short hand for denoting all the conditions in the ancestors of v, e.g., $P(Xi=x|v)=P(Xi=x|Cv'=bv', Cv''=bv'' \ldots, Cv0=bv0)$.

FIG. 1 illustrates operational flow of an exemplary configuration of an initial state where no input is provided by the user, in accordance with an embodiment of the present invention.

Figure 4:
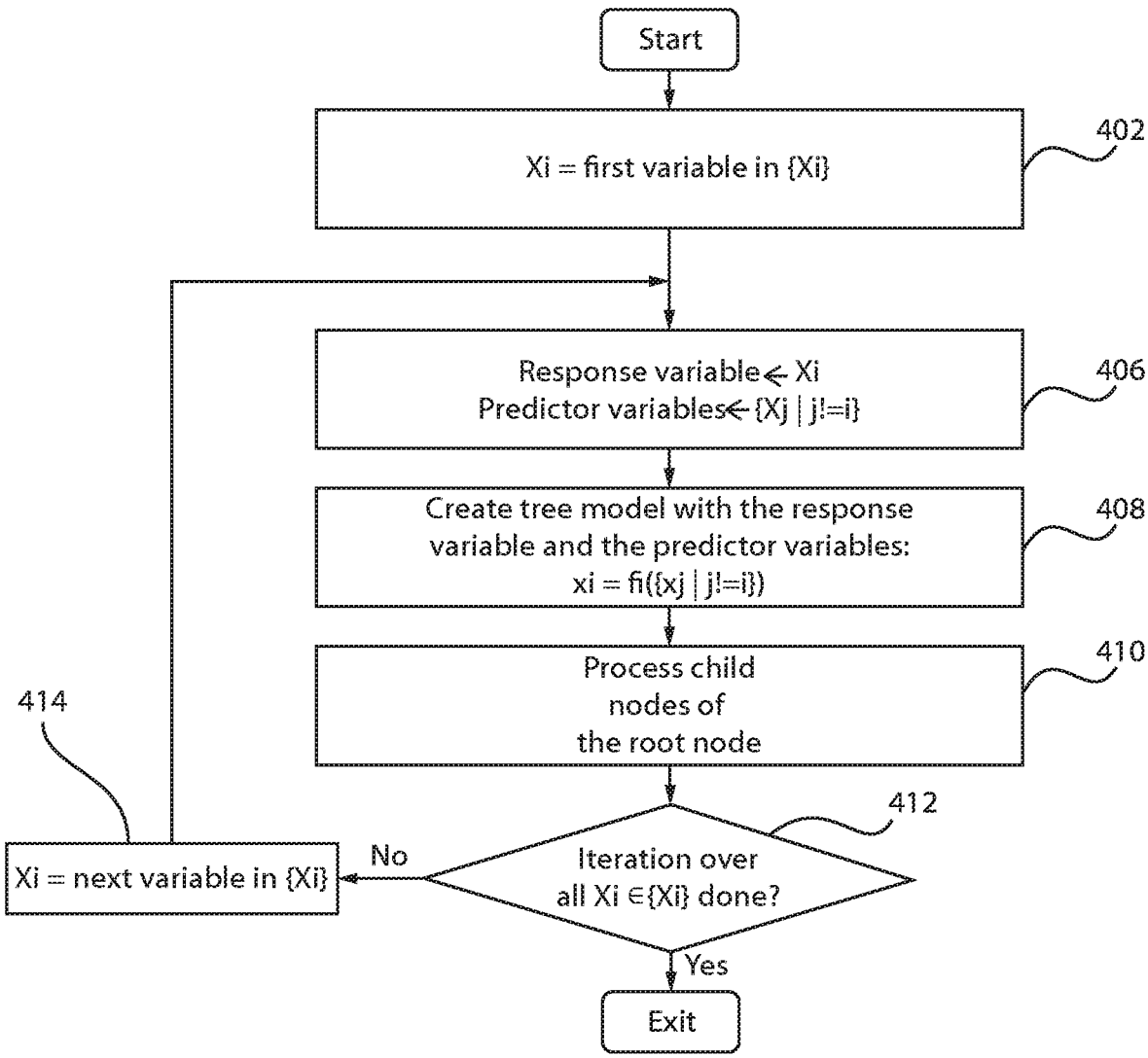
FIG. 4 illustrates a flowchart of a modeling phase, in accordance with an embodiment of the present invention.

FIG. 1 corresponds to the exit state of FIG. 4. The tree structure of FIG. 1 represents a decision tree model, constructed at block 408 of FIG. 4. Block 408 is performed by, e.g., a machine learning library, which supports decision tree and regression tree models. This computation is a type of supervised machine learning, which uses training data of all the variables.

Figure 5:
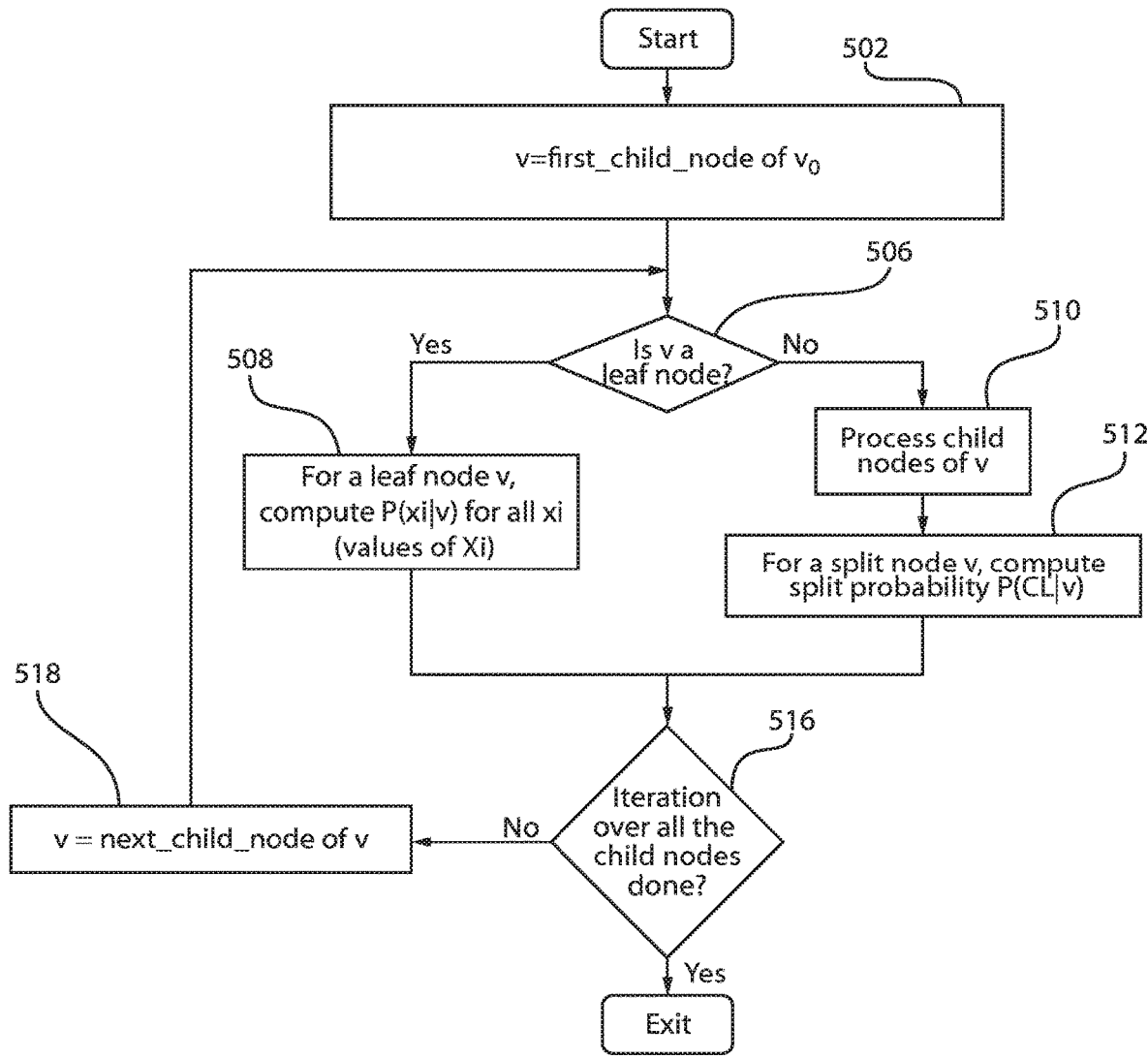
FIG. 5 illustrates a flowchart of process child nodes of root node of v ($v_o$), in accordance with an embodiment of the present invention.

In addition to the tree structure, the following values are computed and set to nodes in block 410, whose detail is described in FIG. 5. The process of FIG. 5 is applied recursively from a root node to leaf nodes in, e.g., a Depth First Search (DFS) methodology. As a result, the computation of the values is executed from the leaf nodes to the root node.

The leaf nodes (right-most boxes) have probabilities of a response variable $xi=0$ and $xi=1$ ($p(xi=0|v)$ and $p(xi=1|v)$). This probability is computed from the numbers of training data which belong to the leaf nodes (block 508).

Other intermediate nodes are split nodes. The split nodes have the split conditions (e.g., $x2<c2$) and the probabilities of the split conditions being satisfied or unsatisfied (e.g., True, P=0.25). This probability is computed from the number of training data that satisfies or does not satisfy the split conditions (block 512).

The probabilities of the response variable $xi$ being 0 or 1 for the split nodes are computed in block 512, using the following formula:

$$P(X_i|v') = \Sigma_{b \in \{true, false\}} P(C_{v'}=b|v') P(X_i|vb),$$

vb=one of $\{v_{true}, v_{false}\}$, which are the child nodes of $v'$.

As a result, all the nodes will have the probabilities of the response variable $xi$ being 0 and $xi$ being 1. The one in the root node corresponds to the output of this method in the initial state (block 614 of FIG. 6).

Figure 2:
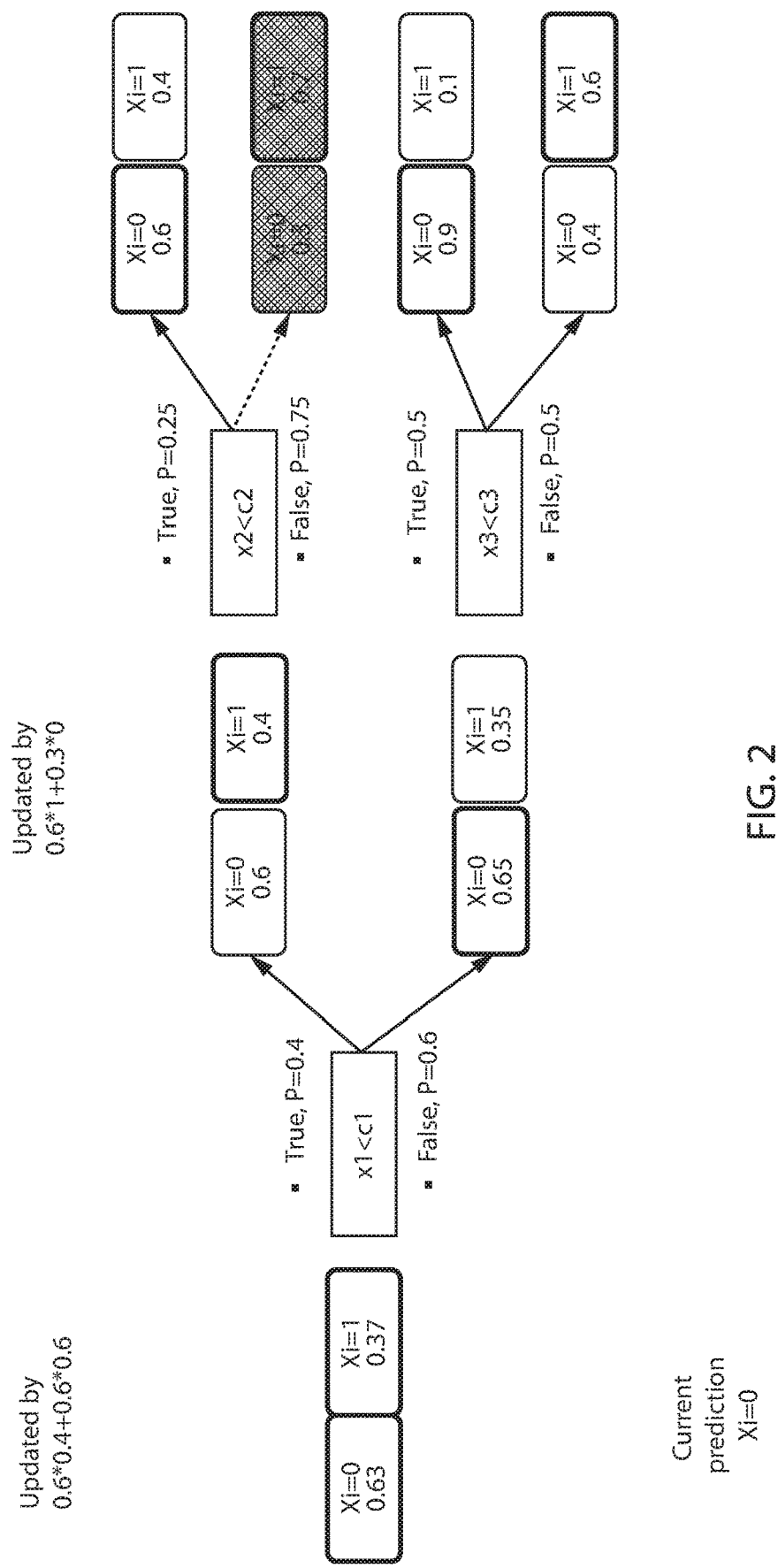
FIG. 2 illustrates operational flow of an exemplary configuration where x2<c2 is being input, in accordance with an embodiment of the present invention.

FIG. 2 illustrates operational flow of an exemplary configuration where x2<c2 is being input, in accordance with an embodiment of the present invention.

Figure 6:
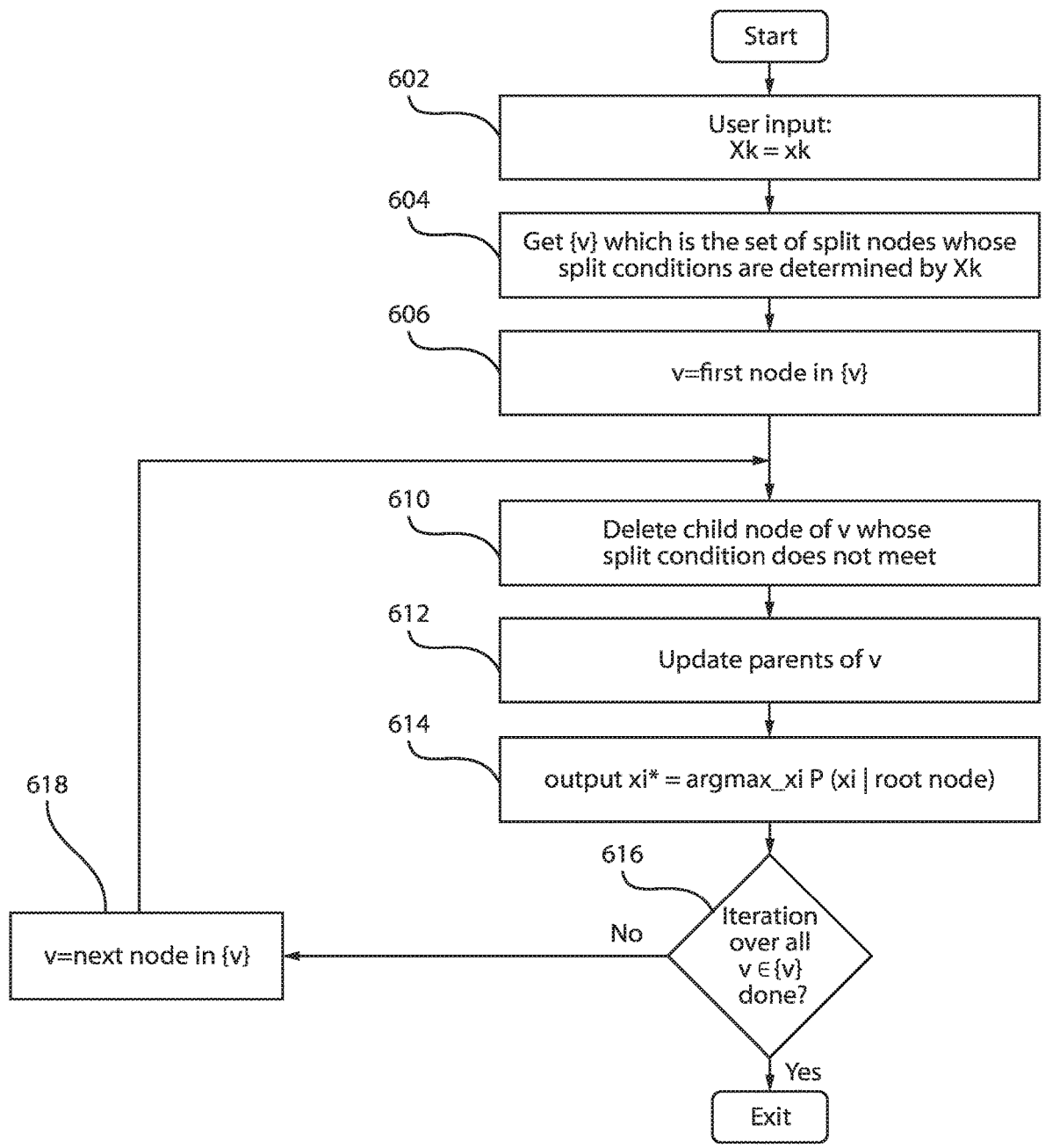
FIG. 6 illustrates a flowchart of a prediction phase, in accordance with an embodiment of the present invention.

FIG. 2 corresponds to the end state of FIG. 6

A value of x2 was input by a user and x2<c2 is satisfied.

In this case, the split condition of the node is determined by the input x2. (see block 604 of FIG. 6). Then, let this node call v.

A child node of the above node, which is illustrated with shading, is removed from the tree (e.g., the split probability for this child node is set to 0). (see block 610 of FIG. 6)

Figure 7:
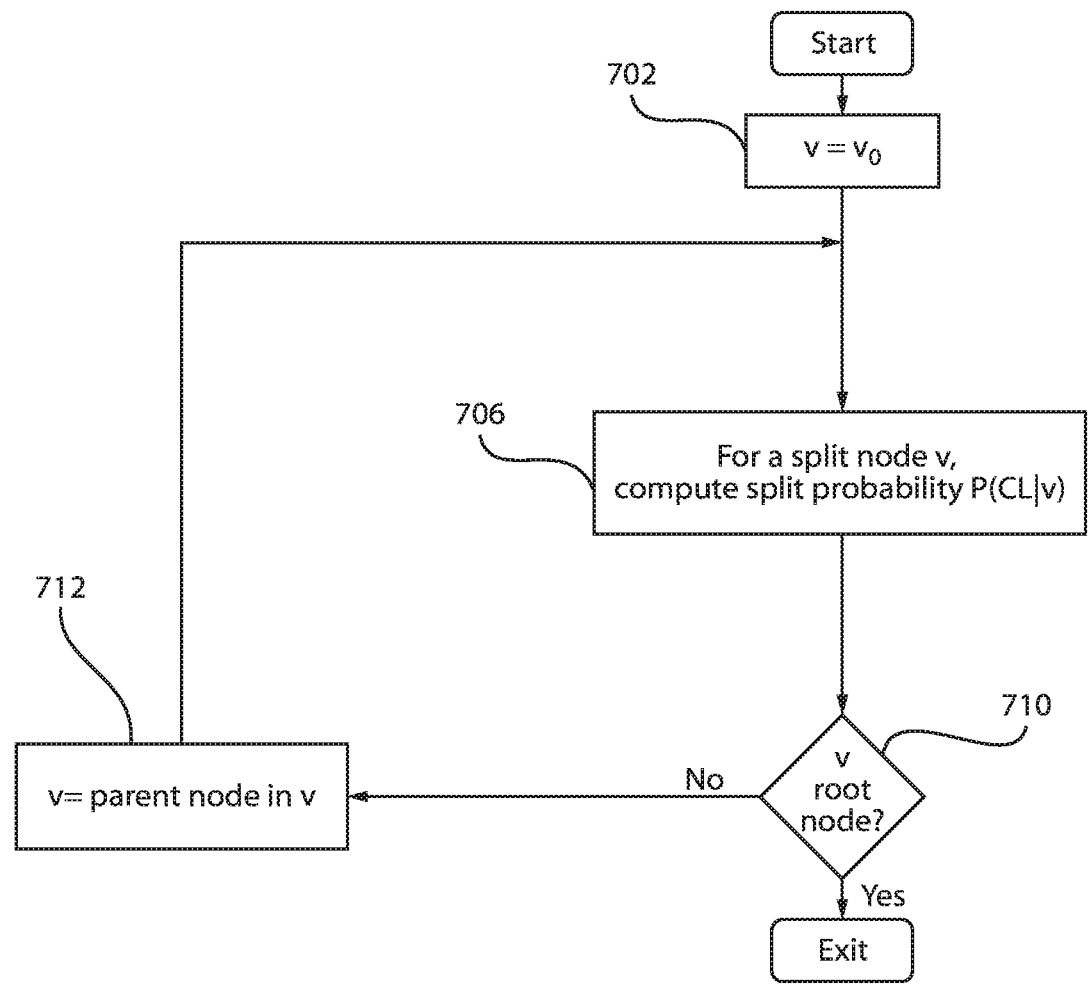
FIG. 7 illustrates a flowchart of updated parents of $v_o$, in accordance with an embodiment of the present invention.

The probabilities of xi=0 or 1 in the parent nodes of node v are updated by in block 612 of FIG. 6, whose detail is described in FIG. 7.

The process of FIG. 7 is applied from v to the root node.

Both the probabilities of xi and the split probabilities of the nodes are updated by the same formulae with the ones used in setting the initial state (FIG. 4).

As a result, all the nodes will have the probabilities of the response variable xi being 0 and xi being 1. The one in the root node corresponds to the output of this method in the state of x2 being input by the user.

Figure 3:
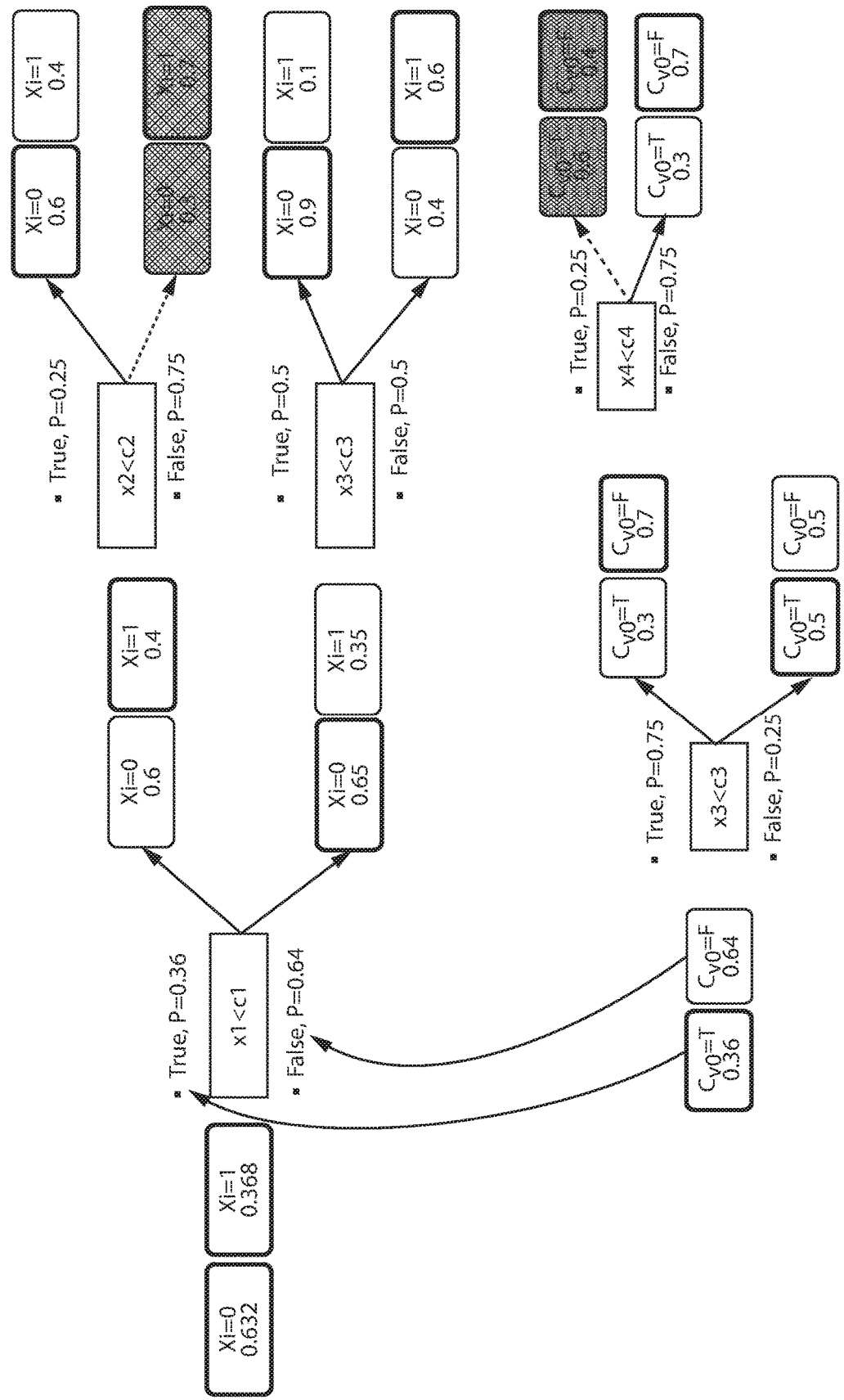
FIG. 3 illustrates operational flow of an exemplary configuration of an extended method, in accordance with an embodiment of the present invention.

FIG. 3 illustrates operational flow of an exemplary configuration of an extended method, in accordance with an embodiment of the present invention.

FIG. 3 corresponds to an initial state of a prediction phase for an extended method flow.

The tree on the top is a decision tree model for variable Xi, which is created with a modeling phase process of the original method.

The tree on the bottom is a decision tree model for the split condition $C_{v0}=(x1<c1)$ of a node v0 of the tree model for prediction of Xi (in general, this node need not be the root node).

Here a split condition is regarded as a quantitative value which takes true or false.

$$C_{v0}=(xi<ci) \in \{true, false\}$$

The decision tree models are constructed for the split conditions by reusing the tree structure of the same variable. In this case, the tree is taken from a regression tree model of the variable x1.

The probability of $C_{v0}$ being true or false is computed for each leaf node from the training data.

In the prediction phase, the system first updates the probability of xi and the probability of $C_{v0}$ using the original method described in the prediction phase flow chart. In this case, x4 and x2 are already input.

In this extended method, the system further updates the probability of xi by using the probability of $C_{v0}$ as the split probability of the condition x1<c1 in the tree model of xi. This takes the correlations between the variables into account and improves accuracy of the prediction when many variables are not input by the user.

FIG. 4 illustrates a flowchart of a modeling phase, in accordance with an embodiment of the present invention.

At block 402, Xi is set to be equal to a first variable in {Xi}.

At block 406, a response variable is ←Xi and predictor variables are ←{Xj|j !=i}.

At block 408, a tree model is created with the response variable and the predictor variables, such that: xi=fi({xj|j !=i}).

At block 410, child nodes of a root node are processed.

At block 412, it is determined whether iteration over all Xi ∈{Xi} is complete. If YES, the process ends. If NO, the process proceeds to block 414.

At block 414, the Xi is set to be equal to the next variable in {Xi}.

FIG. 5 illustrates a flowchart of process child nodes of $v_o$, in accordance with an embodiment of the present invention.

At block 502, v is set to be equal to first_child_node of $v_0$.

At block 506, it is determined whether v is a leaf node. If YES, the process proceeds to block 508. If NO, the process proceeds to block 510.

At block 508, for a leaf node v, P(xi|v) is computed for all xi (values of Xi).

At block 510, the child nodes of v are processed.

At block 512, for a split node v, a split probability P(CL|v) is computed.

At block 516, it is determined whether the iteration over all the child nodes is completed. If YES, the process ends. If NO, the process proceeds to block 518.

At block 518, v is set to be equal to next_child_node of v.

FIG. 6 illustrates a flowchart of a prediction phase, in accordance with an embodiment of the present invention.

At block 602, a user input is Xk=xk.

At block 604, {v} is obtained, which is a set of split nodes whose split conditions are determined by Xk.

At block 606, v is set to be equal to a first node in {v}.

At block 610, a child node of v whose split condition is not met is deleted.

At block 612, the parents of v are updated.

At block 614, output xi* is equal to argmax_xi P(xi|root node).

At block 616, it is determined whether iteration over all v∈{v} is complete. If YES, the process ends. If NO, the process proceeds to block 618.

At block 618, v is set to be equal to the next node in {v} and reverts back to block 610.

FIG. 7 illustrates a flowchart of updated parents of $v_o$, in accordance with an embodiment of the present invention.

At block 702, v is set to be equal to $v_o$.

At block 706, for a split node v, the split probability P(CL|v) is computed.

At block 710, it is determined whether v is a root node. If YES, the process ends. If NO, the process proceeds to block 712.

At block 712, v is set to be equal to the parent node of v and reverts back to block 706.

Figure 8:
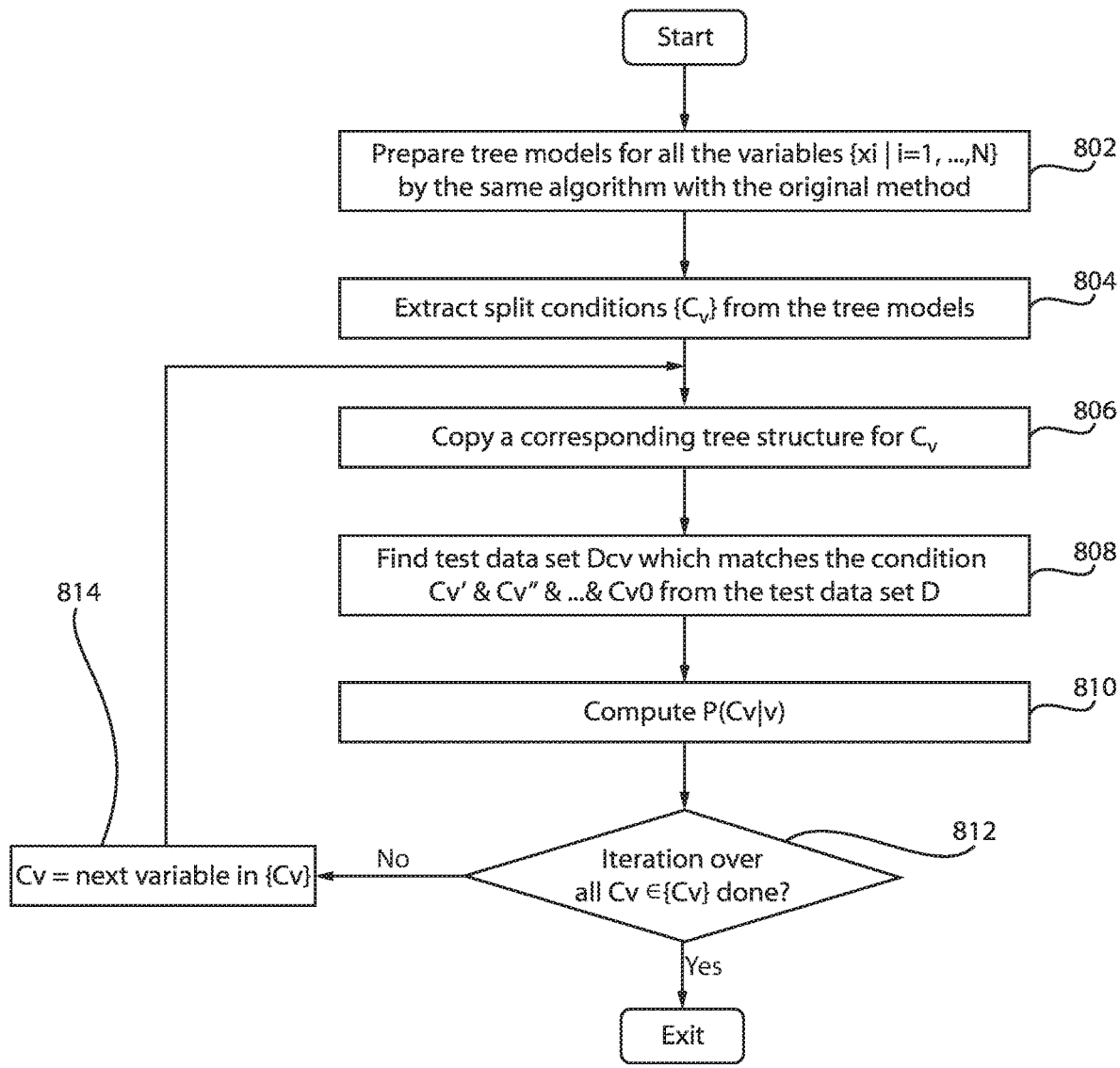
FIG. 8 illustrates a flowchart of a modeling phase of the extended method, in accordance with another embodiment of the present invention.

FIG. 8 illustrates a flowchart of a modeling phase of the extended method, in accordance with another embodiment of the present invention.

At block 802, tree models are prepared for all the variables {xi|i=1, . . . , N} by the same algorithm with the original method.

At block 804, split conditions {Cv} are extracted from the tree models.

At block 806, a corresponding tree structure for Cv is copied.

At block 808, a test data set Dcv is found, which matches the condition: Cv' & Cv" & . . . & Cv0 from the test data set D.

At block 810, probability P(Cv|v) is computed.

At block 812, it is determined whether iteration over all Cv∈{Cv} is complete. If YES, the process ends. If NO, the process proceeds to block 814.

At block 814, Cv is set to be equal to the next variable in {Cv} and reverts back to block 806.

Figure 9:
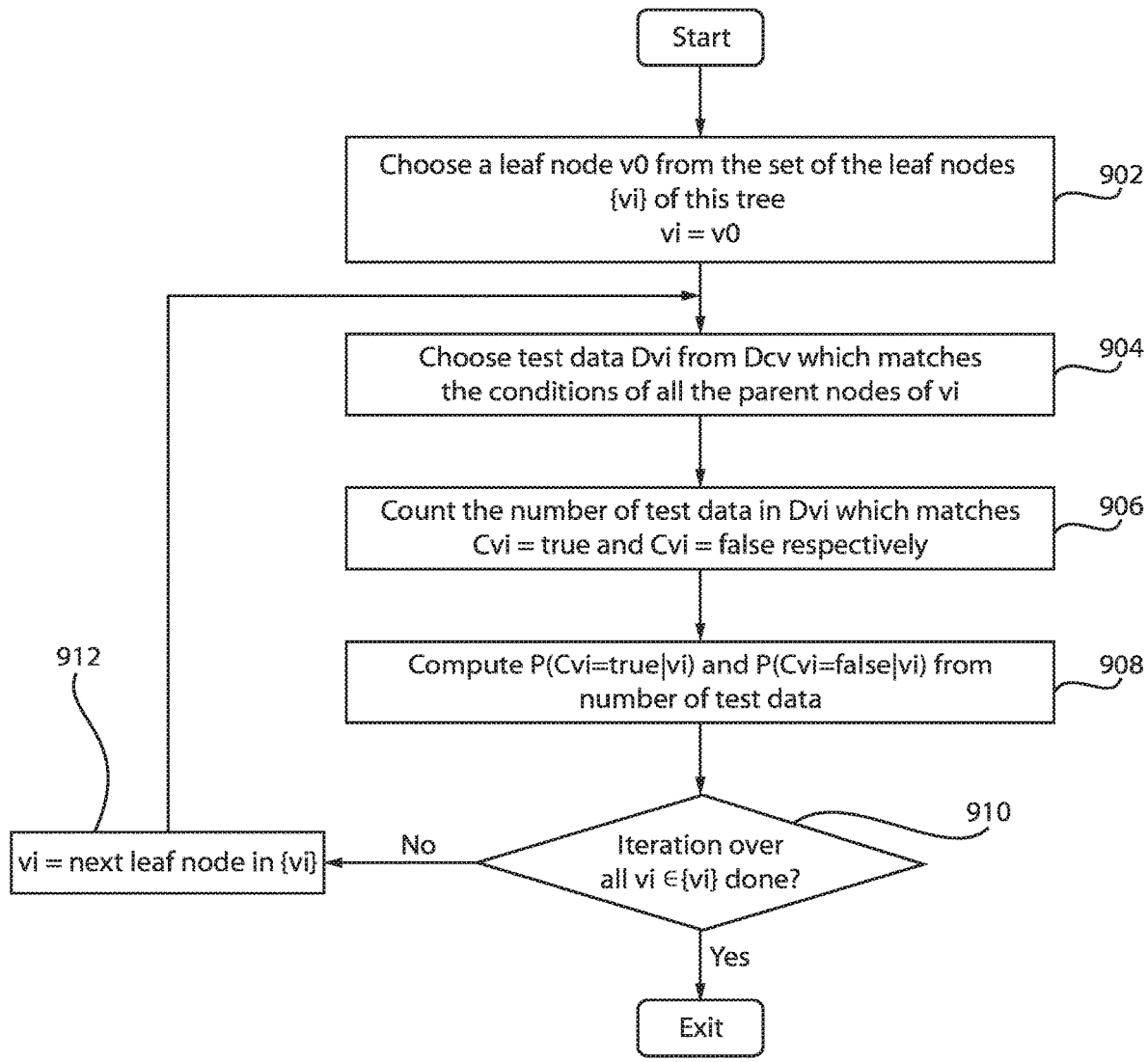
FIG. 9 illustrates a flowchart of a computational phase of the extended method, in accordance with an embodiment of the present invention.

FIG. 9 illustrates a flowchart of a computational phase of the extended method, in accordance with an embodiment of the present invention.

At block 902, a leaf node v0 is chosen from the set of the leaf nodes {vi} of the tree vi=v0.

At block 904, test data Dvi is chosen from Dcv, which matches the conditions of all the parent nodes of vi.

At block 906, the number of test data in Dvi is counted, which matches Cvi=true and Cvi=false, respectively.

At block 908, probabilities P(Cvi=true|vi) and P(Cvi=false|vi) are computed from the number of test data.

At block 910, it is determined whether iteration over all vi∈{vi} is complete. If YES, the process ends. If NO, the process proceeds to block 912.

At block 912, vi is set to be equal to the next leaf node in {vi} and the process reverts back to block 904.

Figure 10:
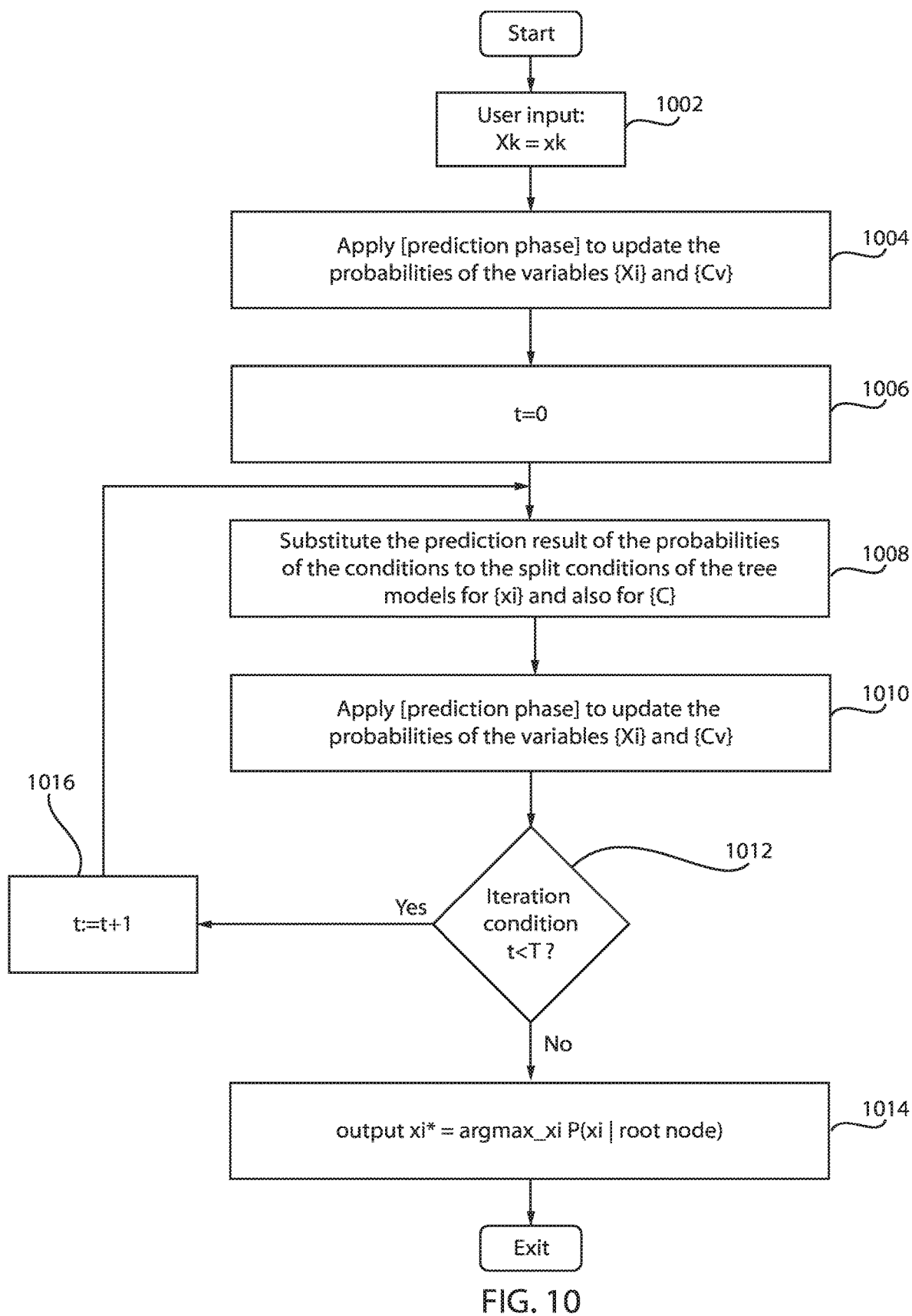
FIG. 10 illustrates a flowchart of a prediction phase of the extended method, in accordance with another embodiment of the present invention.

FIG. 10 illustrates a flowchart of a prediction phase of the extended method, in accordance with another embodiment of the present invention.

At block 1002, a user inputs Xk=xk.

At block 1004, the prediction phase is applied to update probabilities of variables {Xi} and {Cv}.

At block 1006, t=0.

At block 1008, a prediction result of the probabilities of the conditions are substituted to the split conditions of the tree models for {xi} and also for {C}.

At block 1010, a prediction phase is applied to update the probabilities of the variables {Xi} and {Cv}.

At block 1012, it is determined whether iteration condition t<T is met. If NO, the process proceeds to block 1014. If YES, the process proceeds to block 1016.

At block 1014, output xi* is set to be equal to argmax_xi P(xi|root node).

At block 1016, t:=t+1 and the process reverts back to block 1008.

With reference to FIGS. 3 and 8-10, and in regards to preparation:

For each Xi, by re-using the model for predicting Xi, a prediction model of the split probability P(CL(Xi)|v') is created where v' is the parent node of v and v is a node whose split condition CL(Xi)∈{true/false} depends on Xi. The model is trained with existing data D.

With reference to FIGS. 3 and 8-10, and in regards to prediction:

Iteration Over T Times:

The split probabilities P(CL(Xi)|v') are predicted by the models defined above using the same methods described above.

The split probabilities in the models of the split probabilities P(CL(Xi)|v') are updated.

The split probabilities of the models for predicting Xi with the predicted split probabilities in the above iteration are updated.

Xi is predicted by using the methods described in prediction section above.

In summary, in order to predict a value of an item which is not input, the system uses a regression tree or decision tree model, where the response variable is an item to predict and the predictor variables correspond to the rest of the all the items, including the items whose values are missing. The following steps are executed in order to predict the values with the tree models whose inputs include many missing values.

(1) Each of the split nodes of a tree model has a split probability which is computed from the number of samples of the child nodes in the training phase.

(2) Every node of a tree model has a probability of the response variable being a specific value. The probability of the response variable for the root node is defined as the probability of the response variable of the tree model. The predicted value is the value with the highest probability.

(i) Leaf node: The probability of the response variable is computed from the distributions of samples of the training dataset which belongs to the node.

(ii) Split node: If the satisfaction of the split condition is unknown (because of the missing values), the probability of the response variable is the marginal probability. That is, the sum of the probabilities of the response variable of the child nodes weighted by the split probability.

(iii) Split node: If the satisfaction of the split condition is known (because the values have been input), the probability of the response variable is that of the child node which the condition is met.

(3) Partial update: Every time a new value is input, find nodes whose satisfaction of the split conditions are determined by the input. In that node, remove the sub trees which is not selected by (iii). Apply (ii) and (iii) to the node and its ancestor nodes, up to the root node.

Moreover, a variation to (ii): If a surrogate split variable value is already known, the split condition can be evaluated for the surrogate variable instead. Variation to (1): Instead of using the split probabilities computed from the training samples, the split probabilities predicted by tree models dedicated for this purpose with the method of step (3) can be used. This step can be used for models for the split probability prediction. This step can be iterated for predefined times.

Additionally, regarding prediction, the probability of Xi being a specific value is calculated for all the nodes in the tree. If a predictor variable is not input yet, the probability of Xi is calculated as the marginal probability computed from the probability of Xi in the child nodes and the split probability of the split node. If a predictor variable is already input, the probability of Xi is that of the child node where the split condition is true. These steps are repeated recursively and the probability of Xi at the root node is the output.

Figure 11:
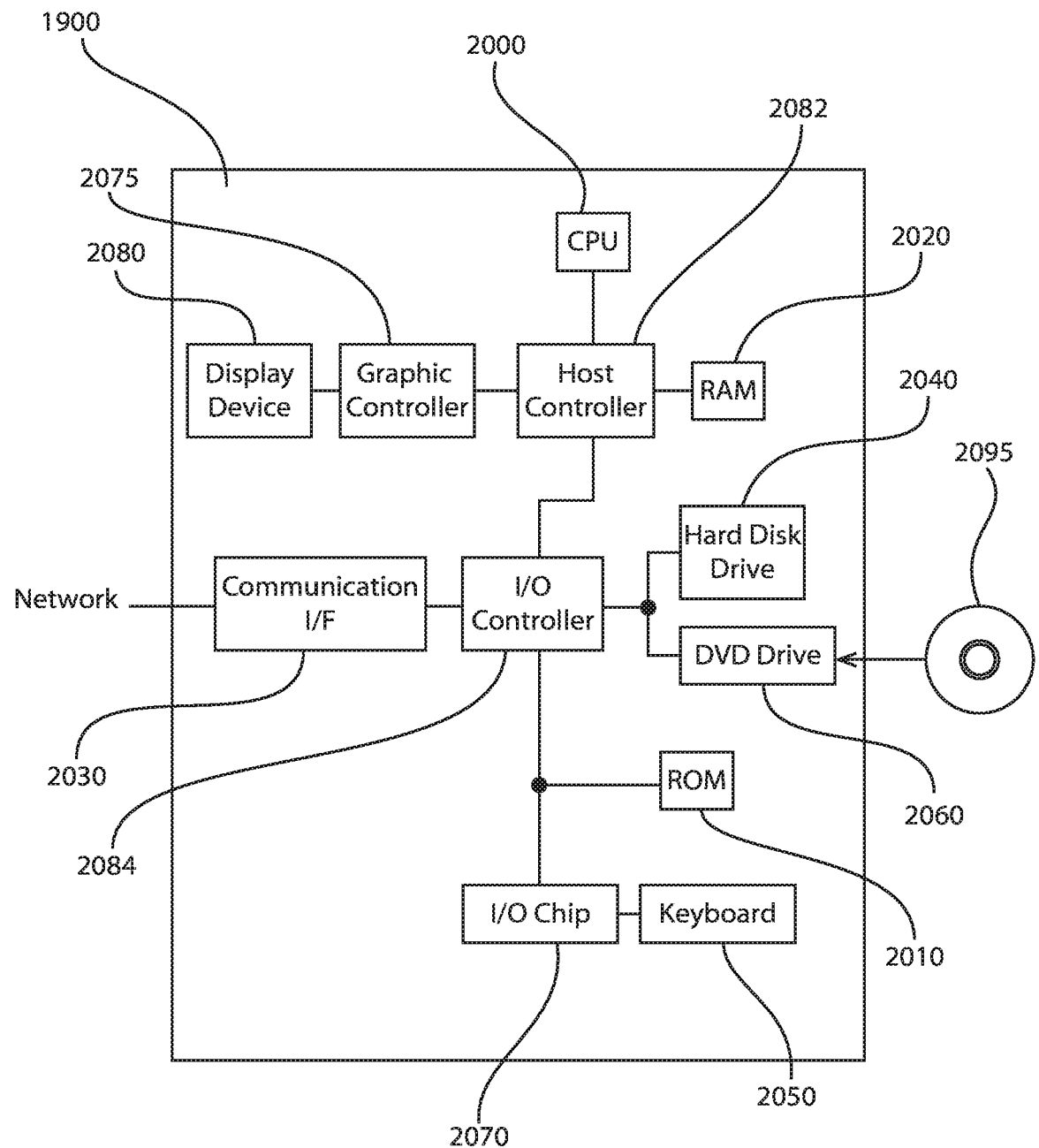
FIG. 11 is a block/flow diagram of an exemplary functional block diagram of a computer system hardware for predicting variables, in accordance with an embodiment of the present invention.

FIG. 11 shows an exemplary configuration of a computer system 1900 according to an embodiment. The computer 1900 according to the present embodiment includes a computer processing unit (CPU) 2000, a RAM 2020, a graphics controller 2075, and a display apparatus 2080, which are mutually connected by a host controller 2082. The computer 1900 also includes input and/or output units such as a communication interface 2030, a hard disk drive 2040, and a DVD-ROM drive 2060, which are connected to the host controller 2082 via an input/output controller 2084. The computer also includes legacy input/output units such as a ROM 2010 and a keyboard 2050, which are connected to the input/output controller 2084 through an input/output chip 2070.

The host controller 2082 connects the RAM 2020 with the CPU 2000 and the graphics controller 2075, which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 can include therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and can provide the hard disk drive 2040 with the text data or the commands via the RAM 2020. The input/output chip 2070 connects a keyboard 2050 to an input/output controller 2084, and can connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

The information processing described in these programs is read into the computer 1900, which is the result of cooperation between the program or module and the above-mentioned various types of hardware resources. Moreover, the apparatus is constituted by realizing the operation or processing of information in accordance with the usage of the computer 1900.

For example, when communication is performed between the computer 1900 and an external device, the CPU 2000 can execute a communication program loaded onto the RAM 2020, to instruct communication processing to a communication interface 2030, based on the processing described in the communication program.

The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 can exchange transmission/reception data with the recording medium by a direct memory access (DMA) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 can cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 can then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc.

Various types of information, such as various types of programs, data, tables, and databases, can be stored in the recording apparatus, to undergo information processing. Note that the CPU 2000 can also use a part of the RAM 2020 to perform reading/writing thereto on the cache memory. In such an embodiment, the cache is considered to be included in the RAM 2020, the memory, and/or the recording medium unless noted otherwise, since the cache memory performs part of the function of the RAM 2020.

The CPU 2000 can perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 can search for information in a file, a database, etc., in the recording medium. For example, when a plurality of entries, each having an attribute value of a first attribute is associated with an attribute value of a second attribute, are stored in a recording apparatus, the CPU 2000 can search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for predicting variables where a portion of the variables are input by a user and a portion of the variables are predicted by the system (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for predicting values of multiple variables, the system comprising:
   a processor; and
   a storage device coupled to the processor, wherein the storage device has stored thereon a program, and wherein the processor is configured to execute the program to perform operations, wherein the operations comprise:
      allowing a user to select a first set of variables and input first values therein; and
      predicting second values for a second set of variables by using decision trees for N regression models, the second values predicted (i) in real-time based on the first values being input by the user and (ii) by extracting split conditions where splits at split nodes are considered with weights proportional to an empirical split ratio so that marginal probabilities are approximated,
   wherein a response variable of each of the N regression models corresponds to one of the first values and predictor variables of each of the N regression models correspond to one or more of the second values predicted in real-time based on the first values being input by the user;
   wherein the split conditions are regarded as quantitative values which take true or false, a probability of a split condition of the split conditions being true or false computed for each leaf node of a plurality of leaf nodes from training data;
   wherein each of the decision trees has a plurality of nodes including the plurality of leaf nodes and the split nodes, each of the decision trees being searched with a depth-first approach; and
   wherein, after the extracting of the split conditions, a corresponding decision tree structure for each of the split conditions is copied and a test data set matching a condition is found to compute a split condition probability, the condition being satisfactions of the split conditions in a path from node v to root node $v^0$, where v is a node within a decision tree of the decision trees and the test data is provided by a machine learning library.

2. The system of claim 1, wherein nodes of the plurality of nodes whose splits are determined as the first values are input.

3. The system in claim 2, wherein, in the identified nodes, subtrees that have no probability of being satisfied are removed.

4. The system of claim 3, wherein, after removing the subtrees, a parent node is recursively updated.

5. The system of claim 1, wherein the split condition probability is computed by selecting a leaf node from the plurality of leaf nodes and selecting test data from the test data set matching conditions of all parent nodes.

6. The system of claim 5, wherein the split condition probability is further computed by counting a number of the selected test data matching split conditions being true and split conditions being false.

7. The system of claim 4,
   wherein if a satisfaction of a split condition is unknown, a probability of a response variable is a marginal probability, the marginal probability being a sum of probabilities of a response variable of child nodes weighted by a split probability; and
   wherein if a satisfaction of a split condition is known, a probability of a response variable is that of a child node for which a condition has been met.

8. The system of claim 1, wherein each of the leaf nodes has a probability of a variable of the second set of variables being a specific value.

9. The system of claim 2, wherein decision tree splits are evaluated for the second set of variables by considering weighted splits.

10. A computer program product for predicting values of multiple variables, the computer program product comprising:
    a computer readable storage medium having computer readable program code embodied therein, the computer readable program code comprising:
    computer readable program code, when executed by a processor of a computer, configured to perform:
       allowing a user to select a first set of variables and input first values therein; and
       predicting second values for a second set of variables by using decision trees for N regression models, the second values predicted (i) in real-time based on the first values being input by the user and (ii) by extracting split conditions where splits at split nodes are considered with weights proportional to an empirical split ratio so that marginal probabilities are approximated,
    wherein a response variable of each of the N regression models corresponds to one of the first values and predictor variables of each of the N regression models correspond to one or more of the second values predicted in real-time based on the first values being input by the user;
    wherein the split conditions are regarded as quantitative values which take true or false, a probability of a split condition of the split conditions being true or false computed for each leaf node of a plurality of leaf nodes from training data;
    wherein each of the decision trees has a plurality of nodes including the plurality of leaf nodes and the split nodes, each of the decision trees being searched with a depth-first approach; and
    wherein, after the extracting of the split conditions, a corresponding decision tree structure for each of the split conditions is copied and a test data set matching a condition is found to compute a split condition probability, the condition being satisfactions of the split conditions in a path from node v to root node $v^0$, where v is a node within a decision tree of the decision trees and the test data is provided by a machine learning library.

11. The computer program product of claim 10, wherein the split condition probability is computed by selecting a leaf node from the plurality of leaf nodes and selecting test data from the test data set matching conditions of all parent nodes.

12. The system of claim 1, wherein probabilities of the response variable being 0 or 1 for the split nodes are computed by:

one of $P(X_i|v') = \Sigma_{b \in \{true, false\}} P(C_{v'} = b|v') P(X_i|vb)$, vb=one of $\{v_{true}, v_{false}\}$, which are the child nodes of v', where Xi is a variable of the first set of variables, Cv' is a satisfaction of split conditions in a path from node v to root node $v^0$, and b are Boolean values.

13. The computer program product of claim 10, wherein probabilities of the response variable being 0 or 1 for the split nodes are computed by:

one of $P(X_i|v') = \Sigma_{b \in \{true, false\}} P(C_{v'} = b|v') P(X_i|vb)$, vb=one of $\{v_{true}, v_{false}\}$, which are the child nodes of v', where Xi is a variable of the first set of variables, Cv' is a satisfaction of split conditions in a path from node v to root node $v^0$, and b are Boolean values.

* * * * *